United States Patent
de Waal (10) Patent No.: US 7,340,734 B1
(45) Date of Patent: Mar. 4, 2008

(54) METHOD AND APPARATUS TO MAKE CODE MORE DIFFICULT TO REVERSE ENGINEER

(75) Inventor: Abraham B. de Waal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 807 days.

(21) Appl. No.: 10/650,191

(22) Filed: Aug. 27, 2003

(51) Int. Cl.
*G06F 9/45* (2006.01)

(52) U.S. Cl. .................. 717/159; 717/140; 717/151
(58) Field of Classification Search ......... 717/140–161
See application file for complete search history.

(56) References Cited

U.S. PATENT DOCUMENTS

| | | | | |
|---|---|---|---|---|
| 6,668,325 | B1* | 12/2003 | Collberg et al. ........... | 713/194 |
| 6,694,435 | B2* | 2/2004 | Kiddy ....................... | 713/189 |
| 6,779,114 | B1* | 8/2004 | Chow et al. ............... | 713/189 |
| 7,054,443 | B1* | 5/2006 | Jakubowski et al. ...... | 380/28 |
| 7,080,257 | B1* | 7/2006 | Jakubowski et al. ...... | 713/187 |
| 2005/0183072 | A1* | 8/2005 | Horning et al. ............ | 717/140 |

OTHER PUBLICATIONS

Collberg et al., "A TAxonomy of Obfuscating Transformations", Technical Report#148, Jul. 1997.*
D. Low, "Java Control Flow Obfuscation", Jun. 3, 1998.*
Forrest et al., "Building Diverse Computer Systems", 1997.*
M. Christodorescu et al., "Static Analysis of Executables to Detect Malicious Patterns", Feb. 18, 2003.*
M. Christodorescu et al., "Static Analysis of Binaries for Malicious Code Detection", Aug. 7, 2003.*
"Cloakware/Transcoder." *Cloakware.* Dec. 9, 2003. <http://206.191.60.52/products/transcoder.html>.

* cited by examiner

*Primary Examiner*—William H. Wood
(74) *Attorney, Agent, or Firm*—Patterson & Sheridan, LLP (57) ABSTRACT

Method and apparatus to make code more difficult to reverse engineer is described. Inert instructions are inserted between instructions within a program. The inert instructions may perform logic operations with the net effect of not changing an argument. Furthermore, the inserted inert instructions may be repositioned within the program to further obfuscate the desired function of the program, making the code more difficult to reverse engineer.

17 Claims, 7 Drawing Sheets

FIG. 1A

FIG. 1B mov eax,1234 — 211 mov ebx,1234 — 212 mul ebx,[time_of_day] — 213 add eax,ecx — 214

FIG. 2A mov eax,1234 — 211 xor eax,9696969 — 222 xor eax,9696969 — 223 add eax,ecx — 214

FIG. 2B

```
o1        mov eax,[arg0+0]
o2        mul eax,[arg1+0]
o3        mov ebx,[arg0+4]
o4        mul ebx,[arg1+4]
o5        mov ecx,[arg0+8]
o6        mul ecx,[arg1+8]
o7        add eax,ebx
o8        add eax,ecx
o9        mov [result],eax
```

```
o1        mov eax,[arg0+0]
f1        mov ebx,[arg0+4]
f2        mul ebx,[arg0+8]
f3        mov [temp+0],ebx
o2        mul eax,[arg1+0]
o3        mov ebx,[arg0+4]
o4        mul ebx,[arg1+4]
u1        add eax,1000
u2        stc
u3        sbb eax,999
o5        mov ecx,[arg0+8]
o6        mul ecx,[arg1+8]
o7        add eax,ebx
o8        add eax,ecx
o9        mov [result],eax
```

```
u1 shl eax,1
u2 rcr eax,1 u3 shr eax,1
u4 rcl eax,1 u5 rcr eax,1        repeated 33 times
u6 rcl eax,1        repeated 33 times u7 ror eax,1        repeated 32 times
u8 rol eax,1        repeated 32 times o1 stc
o2 inc eax
o3 sbb eax,0 u9 sub ebx,ebx
u10 add eax,ebx u11 xor eax,ebx
u12 xor ebx,eax
u13 xor eax,ebx o4 stc
o5 inc eax u14 xor ebx,ebx
u15 rcl ebx,1
u16 sub eax,ebx
```

METHOD AND APPARATUS TO MAKE CODE MORE DIFFICULT TO REVERSE ENGINEER

FIELD OF THE INVENTION

One or more aspects of the invention generally relate to making code more difficult to reverse engineer.

BACKGROUND OF THE INVENTION

There are many software authorization schemes in place today. A common approach is to provide authorized users a key code to decrypt software. They key may be provided over the Internet, with product purchase or embedded in hardware. However, once a piece of software is accessible, its content is more susceptible to disassembly or decompiling.

One way of limiting disassembly or decompiling, is to limit use of disassemblers or decompilers to authorized users only. Thus, a disassembler or decompiler program would prompt a user for entry of a key to allow disassembly or decompiling to take place. Additionally, with respect to protecting software after disassembly or decompiling, others have made code difficult to follow by not having processing flow indicated by ordering of instructions. Still others have time limits processing for instructions to mitigate against step-by-step execution of instructions for those attempting to reverse engineer.

However, each of the above approaches has its own weaknesses, and thus software is routinely reversed engineered today. Accordingly, it would be desirable to make software code more difficult to reverse engineer. Furthermore, it would be desirable to provide means to make code more difficult to reverse engineer that may be used in conjunction with one or more of the above-described prior approaches.

SUMMARY OF THE INVENTION

The current invention involves methods and apparatus to make software code more difficult to reverse engineer.

Various embodiments of a method of the invention include obtaining an algorithm instantiated in code. At least two instructions of the code are obtained. Inert instructions are inserted between the at least two instructions obtained.

Various embodiments of the invention include a programmed computer. The programmed computer includes a central processing unit, an input/output interface, and a memory. The central processing unit is configured to execute a code obfuscation program to insert inert instructions in portions of one or more programs. The input/output interface is configured to interface with the central processing unit. The memory stores at least a portion of the code obfuscation program.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough understanding of aspects of the invention as described with respect to exemplary embodiments herein. However, it will be apparent to one of skill in the art that one or more aspects of the invention may be practiced without one or more of these specific details. In other instances, well-known features have not been described for purposes of clarity.

Figure 1A:
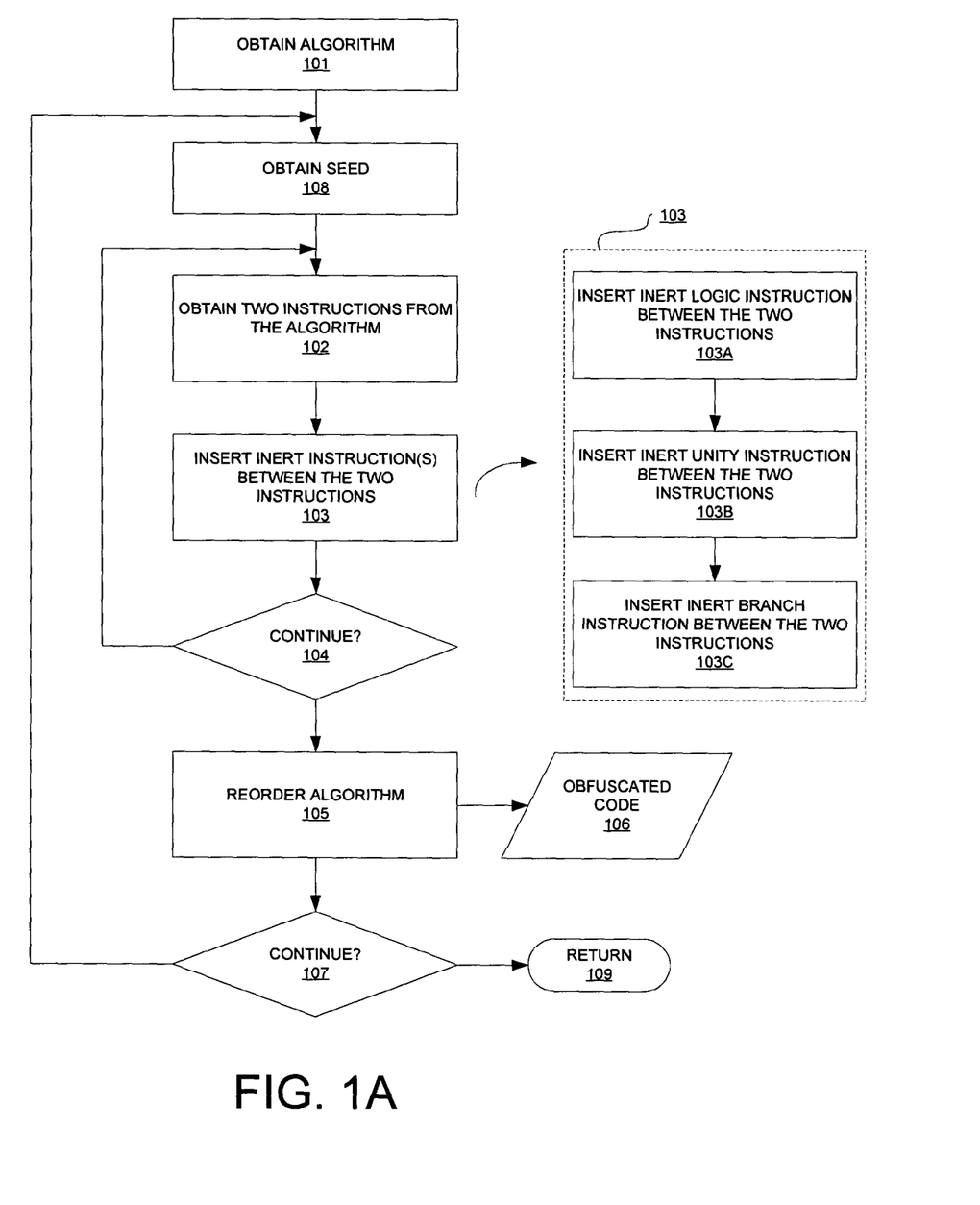
FIG. 1A is a flow diagram depicting an exemplary embodiment of a code obfuscation flow.

FIG. 1A is a flow diagram depicting an exemplary embodiment of a code obfuscation flow 100. An algorithm, for example as implemented in software code, is obtained at 101. At 108, optionally a seed is randomly or pseudo-randomly obtained from a pool of seeds. Alternatively the seed is generated using a random or pseudo-random function. Such a seed may be used in connection with the algorithm obtained at 101 to determine which instructions will have obfuscation code inserted between them. Furthermore, such a seed may set a threshold level, e.g., number of inert instructions per instruction, total number of inert instructions, and the like, for obfuscation. Accordingly, a seed may be used to make different obfuscated code results 106, as well as different levels of obfuscation. A different seed may be selected for each build, e.g. code drop, compile, downloaded copy, released version, or the like, of the code. Therefore, each build of obfuscated code may be unique such that a program developed to reverse engineer a build of obfuscated code may not be reused to reverse engineer another build of obfuscated code.

At 102, at least two instructions from the algorithm are obtained. At 103, inert instructions are inserted between the at least two instructions obtained at 102. By "inert", it is meant that such instructions do not have any impact on the outcome of the algorithm other than possibly adding some modicum of processing time. Thus, inert instructions are included to merely obfuscate the algorithm implemented.

Inert instructions may be randomly or pseudo-randomly obtained from a pool of inert instructions for insertion at 103. It should be appreciated that the number, type and combination of instructions that may be added is substantial. Accordingly, selecting from such a large pool increases the effect of obfuscation.

Notably, registers, or more particularly operands stored in registers, for such inert instructions should be selected to at least appear to be legitimate. One approach to creating an appearance of legitimacy, is use a same set of registers for both algorithm instructions and inert instructions. Thus, inert instruction would operate on registers used to process the algorithm. For example operands stored in registers may be temporarily modified by one or more inert instructions and later restored by one or more additional inert instructions. Specifically a data value of 3 could be corrupted by adding 1 (giving 4) and later restored by subtracting 1. The total transform is inert, but the inclusion of the inert instructions assists with obfuscation. The obfuscator keeps track of the insertion of inert instructions that modify operands stored in registers used to process the algorithm.

Types of inert instructions, one, some or all of which may be inserted at 103, are inert logic instruction, inert unity instruction, and inert branch instruction. An inert logic instruction includes one or more mathematical or Boolean logic operators, e.g., add, sub (subtract), OR, AND, and the like, having no affect on the algorithm. Other examples include (x+1)−1, (x*2)/2, ((x XOR n) XOR n), (x+x*4)/5, and the like. Thus, a transformation of the software code into obfuscated software code is accomplished through the insertion of one or more inert logic instructions. An inert unity instruction includes a mathematical or a Boolean logic operator and the net result of one or more inert unity instructions is an operand or register used by the algorithm maintains or is restored to its proper value, i.e., one or more inert unity instructions perform an identity function.

To further obfuscate the software code, actual variables of the algorithm are used; however, as the outcome is an identity, such instructions have no net effect on variables of the algorithm. Insertion of one or more inert branch instructions adds logical branching, including, but not limited to, one or more branches within one or more other branches. The net outcome is the same independent of the path chosen, namely, continuation of the algorithm. The insertion of inert branch instructions can have a significant impact on further obfuscating the software code. Thus, for example, at 103A a portion of 103 may include insertion of one or more inert logic instructions, at 103B another portion of 103 may include insertion of one or more inert unity instructions, and at 103C another portion of 103 may include insertion of one or more inert branch instructions.

At 104, a determination of whether to continue with insertion of instructions is made. For example, after insertion of approximately one or more hundred inert instructions for each instruction in the software code, it may be determined the software code is sufficiently obfuscated. Such a determination may be based on a number of insertions made for each instruction in the software code, the number of inert branch instructions inserted, the seed obtained at 108, or any combination of these.

At 105, optionally instructions may be reordered to avoid any logical progression to further obfuscate the algorithm obtained at 101. For example, two or more independent streams of instructions may be combined, interleaving the instructions to form a single stream of instructions. Inserted inert instructions may be moved earlier or later in an instruction stream within constraints. The constraints are determined using a live-dead analysis, such as used in compilers and known to those skilled in the art. From 105, obfuscated code 106 is output.

At 107, optionally a determination regarding whether to continue obfuscating code may be made. If it is determined to stop, then code obfuscation flow 100 ends at 109, and if it is determined to continue, then another seed is obtained at 108. Notably, by seeding code obfuscation flow 100 at 108, consecutive builds, e.g., compact disc writes, Internet downloads, or the like, could likely have different obfuscations. Thus, this would aide in thwarting de-obfuscation (reverse engineering) techniques that rely on comparing obfuscated code results 106, such as by binary comparisons. Notably, a seed could be user specific to aide in detecting where copying or reverse engineering may be occurring. Additionally, by inserting inert instructions, especially at different locations, an encrypted obfuscated code 106 is made more difficult to decrypt without a key should encryption be desired.

It should be understood that code obfuscation flow 100 may be implemented as part of a code generator, such as a compiler. Thus, the above-described transformation of software code into obfuscated software code by inserting one or more inert instructions between instructions in the software code, including instructions that operate on algorithm variables may be programmatically done. Specifically, an embodiment of the method of code obfuscation flow illustrated in FIG. 1A may be included in a compiler.

Though it is possible to create an optimizing compiler for programs written in C, for example optimizing compilers configured to remove "dead" code are exceptionally expensive to create. Furthermore, optimizing compilers conventionally are not available for assembly or machine level instructions. Thus, code obfuscation flow 100 may be implemented at an assembly or machine level so as to make reverse engineering more problematic. Specifically, inert instructions may be inserted at a hardware or machine-level to make reverse engineering more problematic. Moreover, internal registers may be used in an implementation to further obfuscate due to the variety of functions performed using internal registers. Furthermore, inert instructions that do not readily translate to C, for example, may be used so as to create a set of inert instructions that do not readily translate to one or more higher-level languages. Specifically, the C language does not have the notion of a Carry bit, like an x86 processor does. Therefore RCL EAX,1 will not translate to an easily readable C implementation. Processors have many specific characteristics, such as a Parity flag, BCD number manipulation (AAD, AAA, AAM), and the like which require more complicated code when implemented in C. Using inert instructions that do not readily translate to a higher-level language results in a translated program that may be as complex as the original assembly code including inert instructions.

Figure 1B:
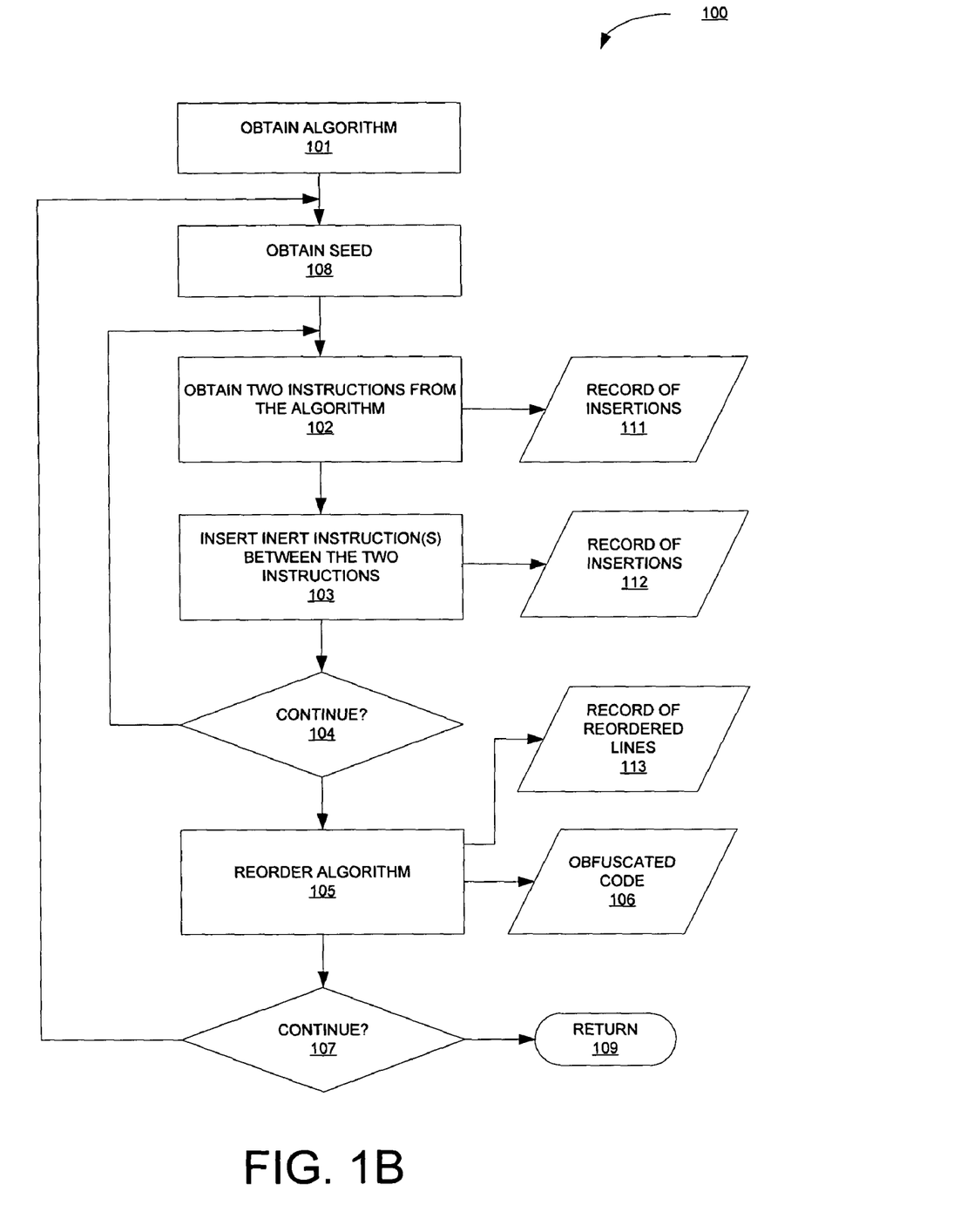
FIG. 1B is a flow diagram depicting another exemplary embodiment of a code obfuscation flow.

Because additional runtime is added with the addition of inert instructions, such inert instructions may be added between non-time dependent or time insensitive instructions. Furthermore, referring to FIG. 1B, records 111 and 112 of insertion locations, such as insertions made at 102 and 103, respectively, are made or maintained for association with each obfuscated code 106. In an alternate embodiment records 111 and 112 include specific inserted instructions. Records 111 and 112 may be stored in memory, such as memory 502 of FIG. 5. A record may be later retrieved by or for an authorized user for subsequent removal of inserted inert instructions. Also, a record 113 of how instructions are reordered may optionally be maintained for association with obfuscated code 106, such as store in memory 502 of FIG. 5. Such a record 113 may later be used for returning code to its pre-reordered form. For example, obfuscated code may be made sufficiently large (by inserting inert instructions) to make copying more problematic. However, to avoid slow runtime, a user may be provided with a record of insertions to indicate where jump instructions should be inserted by a compiler to accelerate execution.

To further describe aspects of the invention, examples of obfuscated code are described with respect to FIGS. 2A, 2B, 3A, 3B, 3C, 3D, and 4.

Figure 2A:
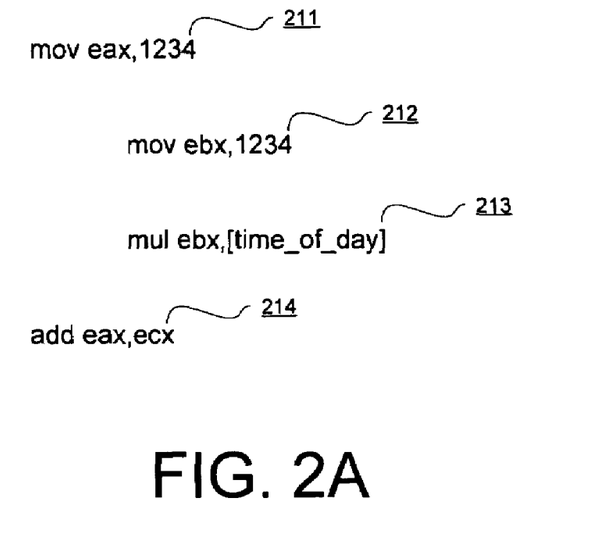
FIGS. 2A and 2B are code listings depicting examples of obfuscated code.
Figure 2B:
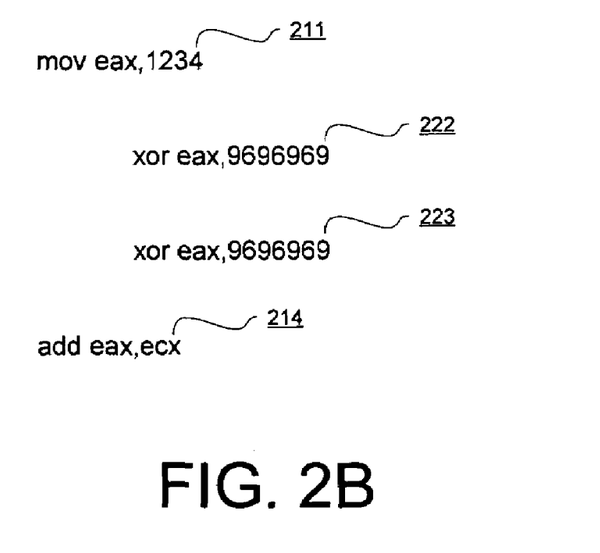

In FIG. 2A, original lines of assembly code or instructions 211 and 214 are obtained, and inserted between such instructions are inert logic instructions 212 and 213. In an alternate embodiment of obfuscated code instructions 213 and 214 are reordered such that instruction 213 follows instruction 214. In FIG. 2B, original lines of code or instructions 211 and 214 are obtained, and inserted between such instructions are inert unity instructions 222 and 223. Notably, in FIG. 2A, the algorithmic data stored in register eax is unchanged by inserted inert logic instructions 212 and 213; however, in FIG. 2B, the algorithmic data stored in register eax is temporarily changed and then changed back using the two inserted inert unity (XOR) instructions 222 and 223.

Figure 3A:
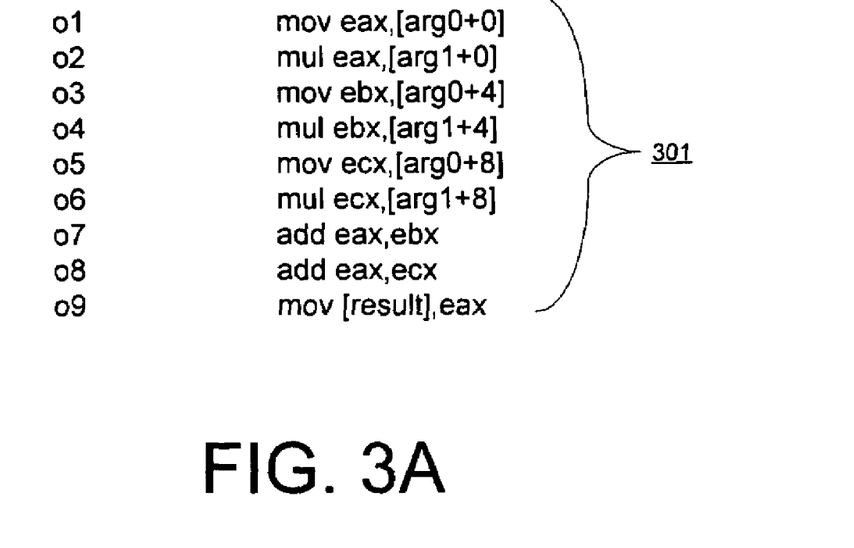
FIGS. 3A, 3B, 3C, and 3D are code listings depicting an exemplary progression from original code to obfuscated code.
Figure 3B:
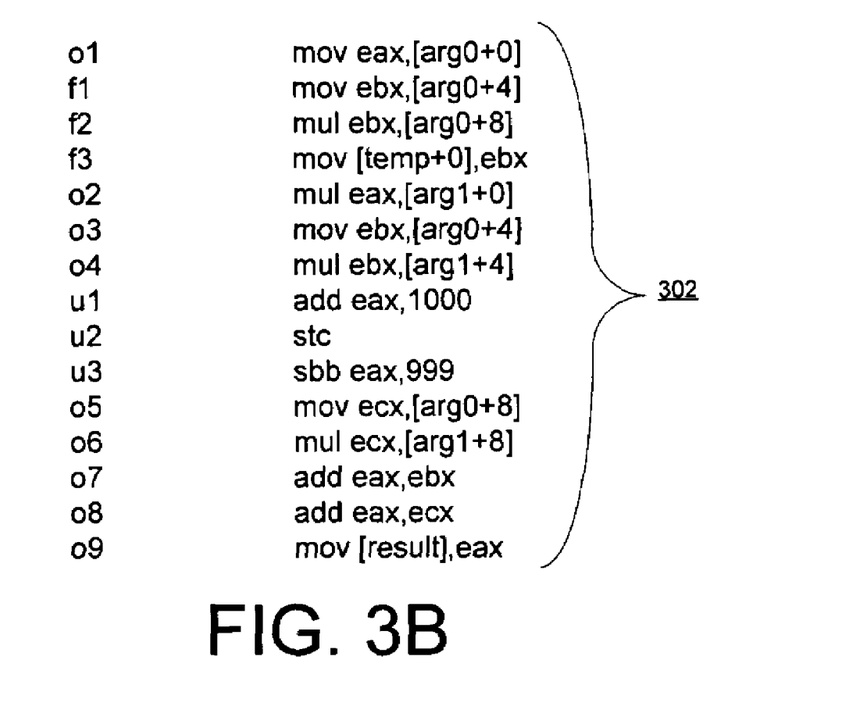
Figure 3C:
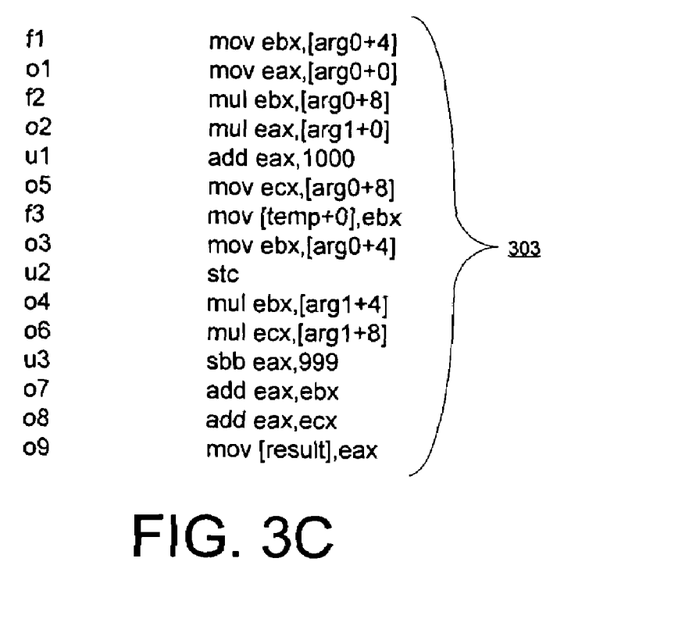

In FIG. 3A, original lines of code 301 are obtained. In FIG. 3B, a set of inert logic instructions f1, f2 and f3 and a set of inert unity instructions u1, u2 and u3 are inserted between two or more original lines of assembly code 301 to provide obfuscated code 302. In FIG. 3C, reordering lines of obfuscated code 302 provides obfuscated code 303. Notably, in obfuscated code 302, inert logic instructions f1, f2 and f3 were sequentially inserted between instructions o1 and o2, and inert unity instructions u1, u2 and u3 were sequentially inserted between instructions o4 and o5. However, in obfuscated code 303, locations of specific inert insertions are changed while the overall sequence of the inserted inert instructions is maintained. In other words, reordering disperses a sequence of inserted inert instructions within the original lines of assembly code. For example, inert logic instruction f1 is reordered such that it immediately precedes instruction o1 and inert unity instruction u1 is reordered such that it immediately follows instruction o2. Using live-dead analysis, obfuscation is constrained such that u3 is not reordered such that u3 is between o7 and o8 because u3 relies on the state of the x86 carry flag, which is modified by o7.

Figure 3D:
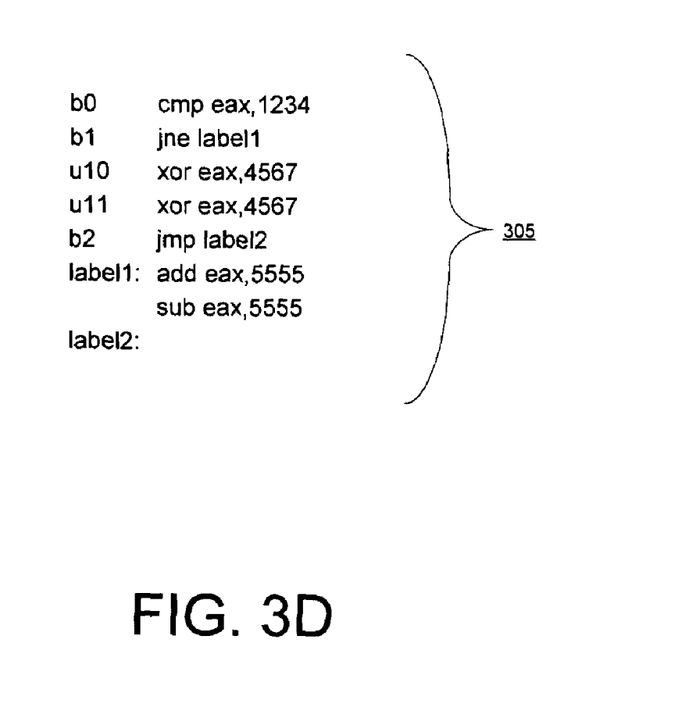

In FIG. 3D inert branch instructions b0, b1, and b2 are inserted in obfuscated code 305. Inert branch instructions b0 and b1 implement a conditional jump to label 1. Inert branch instruction b2 implements a jump to label 2. Label 1 includes inert unity instructions u10 and u11. Obfuscated code 305 may be inserted in original code and reordered by an obfuscator using live-dead analysis.

Figure 4:
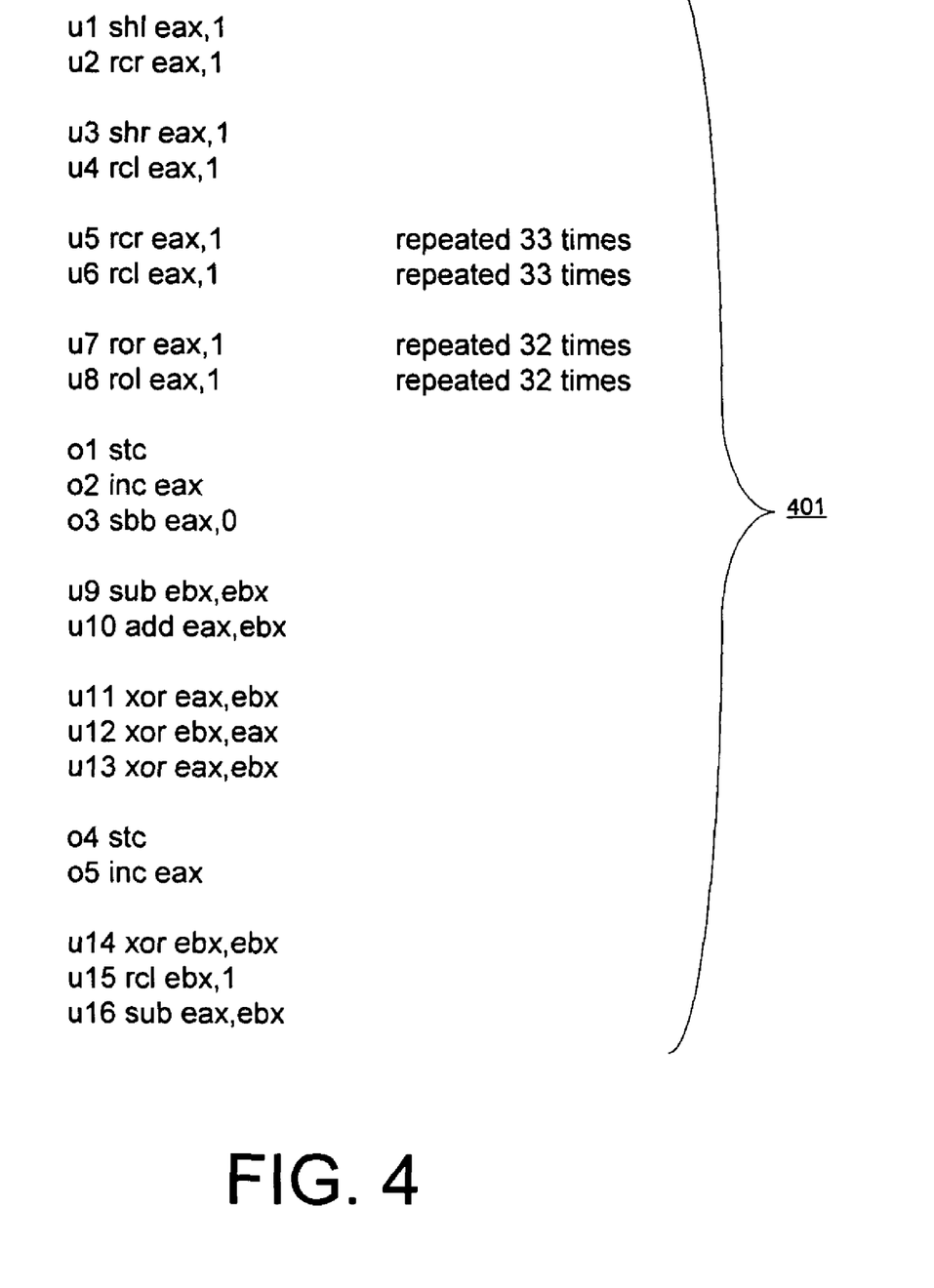
FIG. 4 is a code listing depicting an example of obfuscated code.

In FIG. 4, obfuscated code 401 includes eight different examples of inert instructions, inserting inert unity instructions multiple times. In obfuscated code 401, register eax is unchanged after code 401 is executed. The XOR sequence of inert unity instructions u11, u12, and u12 concludes with storing "eax XOR ebx" in ebx. In one embodiment the obfuscator later replaces operand eax with ebx, effectively restoring eax. In another embodiment the obfuscator explicitly restores eax by moving or copying data from ebx.

Figure 5:
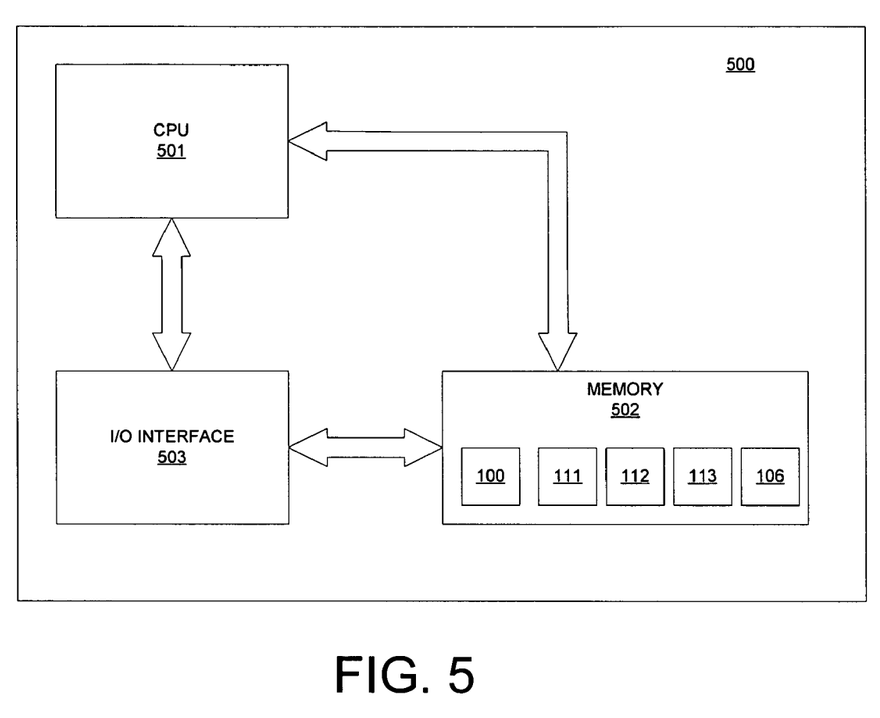
FIG. 5 is a high-level block diagram of an exemplary embodiment of a programmed computer.

FIG. 5 is a high-level block diagram of an exemplary embodiment of a programmed computer 500. Programmed computer 500 includes a central processing unit (CPU) 501, memory 502 and an input/output (I/O) interface 503. CPU 501 may be any type of microprocessor known in the art. Memory 502 may be directly coupled to CPU 501 or coupled through I/O interface 503, and I/O interface 503 may be coupled to a conventional keyboard, network, mouse, display printer, and interface circuitry adapted to receive and transmit data, such as data files and the like.

Memory 502 may store all or portions of one or more programs or data to implement processes in accordance with one or more aspects of the invention. Additionally, those skilled in the art will appreciate that one or more aspects of the invention may be implemented in hardware, software, or a combination of hardware and software.

Programmed computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in memory 502. Memory 502 may include one or more of the following random access memory, read only memory, magneto-resistive read/write memory, optical read/write memory, cache memory, magnetic read/write memory, and the like, as well as signal-bearing media as described below.

Memory 502 may store all or a portion of an embodiment of code obfuscation flow 100. Additionally, memory 502 may store record 111, record 112, record 113, or obfuscated code 106. One or more aspects of the invention are implemented as program products for use with computer 500. Program(s) of the program product defines functions of embodiments in accordance with one or more aspects of the invention and can be contained on computer-readable media having code, which include, but are not limited to: (i) information permanently stored on non-writable storage media (e.g., read-only memory devices within a computer such as CD-ROM or DVD-RAM disks readable by a CD-ROM drive or a DVD drive); or (ii) alterable information stored on writable storage media (e.g., floppy disks within a diskette drive or hard-disk drive or read/writable CD or read/writable DVD).

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

The invention claimed is:

1. A computer readable medium storing a sequence of instructions for execution on a computer for obfuscating code, comprising:
   obtaining an algorithm instantiated in code that includes a sequence of instructions operating on operands stored in registers;
   obtaining at least two instructions of the code;
   obtaining a seed from a pool of seeds wherein the seed is used to determine locations in the code for insertion of inert executable instructions; and
   inserting the inert executable instructions between the at least two instructions obtained, wherein one or more of the inert executable instructions temporarily modify one of the operands stored in one of the registers and another one or more of the inert executable instructions restore the one operand in the one register.

2. The computer readable medium of claim 1, wherein the inert executable instructions include one or more inert unity instructions.

3. The computer readable medium of claim 1, wherein the inert executable instructions include one or more inert logic instructions.

4. The computer readable medium of claim 1, wherein the inert executable instructions include one or more inert branch instructions.

5. The computer readable medium of claim 1, further comprising reordering and intermingling one or more of the inert executable instructions and one or more of the instructions in the code.

6. The computer readable medium of claim 1, further comprising randomly or pseudo-randomly obtaining the inert executable instructions from a pool of instructions.

7. computer readable medium of claim 1, wherein the seed is randomly or pseudo-randomly selected from a pool of seeds.

8. The computer readable medium of claim 1, wherein the seed is used to set a threshold level for obfuscation.

9. The computer readable medium of claim 1, wherein a seed is selected for each build of the code.

10. A computer readable medium as claimed in claim 1, wherein the instructions are inserted only between the at least two instructions which are determined to be non time dependent or time sensitive.

11. A computer readable medium as claimed in claim 1, wherein a sequence of the inert executable instructions is dispersed throughout the sequence of algorithm instructions.

12. A programmed computer, comprising:
a central processing unit configured to execute a code obfuscation program to insert inert instructions in portions of one or more programs;
an input/output interface configured to interface with the central processing unit; and
a memory, the memory storing at least a portion of the code obfuscation program the program comprising a sequence of instructions for:
obtaining an algorithm instantiated in code that includes a sequence of algorithm instructions wherein operating on operands stored in registers;
obtaining at least two instructions of the code; and
inserting executable inert instructions between the at least two instructions obtained, wherein the executable inert instructions are inserted only between at least two instructions which are determined to be non time dependent or time sensitive; and
wherein one or more of the inert executable instructions temporarily modify one of the operands stored in one of the registers and another one or more of the inert executable instructions restore the one operand in the one register.

13. The programmed computer of claim 12, wherein the input/output interface is coupled to the memory.

14. The programmed computer of claim 13, wherein the memory is coupled to the central processing unit.

15. The programmed computer of claim 13, wherein the memory stores at least one seed used during execution of the code obfuscation program.

16. The programmed computer of claim 12, wherein a sequence of the inert executable instructions is dispersed throughout the sequence of algorithm instructions.

17. A computer readable medium storing a sequence of instructions for execution on a computer for obfuscating code, comprising:
obtaining an algorithm instantiated in code that includes a sequence of instructions operating on operands stored in registers;
obtaining at least two instructions of the code;
obtaining a seed from a pool of seeds wherein the seed is used to select a number in inert executable instructions for insertion; and
inserting inert executable instructions between the at least two instructions obtained, wherein one or more of the inert executable instructions temporarily modify one of the operands stored in one of the registers and another one or more of the inert executable instructions restore the one operand in the one register.

* * * * *

UNITED STATES PATENT AND TRADEMARK OFFICE
CERTIFICATE OF CORRECTION

| | | |
|---|---|---|
| PATENT NO. | : 7,340,734 B1 | Page 1 of 1 |
| APPLICATION NO. | : 10/650191 | |
| DATED | : March 4, 2008 | |
| INVENTOR(S) | : Abraham B. De Waal | |

It is certified that error appears in the above-identified patent and that said Letters Patent is hereby corrected as shown below:

In column 6, line 61, please replace "computer readable medium" with
-- The computer readable medium --

Signed and Sealed this

Fifth Day of August, 2008

JON W. DUDAS
*Director of the United States Patent and Trademark Office*